United States Patent Office 3,639,625
Patented Feb. 1, 1972

3,639,625
COMPOSITIONS CONTAINING LITHIUM SUCCINATE
Lewis Sherwin, 4580 Kensington Ave., Montreal, Quebec, Canada
No Drawing. Filed July 13, 1967, Ser. No. 653,029
Int. Cl. A61k 27/00
U.S. Cl. 424—317
3 Claims

ABSTRACT OF THE DISCLOSURE

Therapeutic compositions containing lithium succinate for treating dermatitis and for producing an antipruritic effect.

In accordance with the present invention it has been found that lithium succinate compositions are useful for the relief of symptoms of various skin diseases which occur in a number of clinical conditions of varying etiology. They are particularly useful in the treatment of various skin and scalp disorders. Additionally, when an antipruritic action is required by topical application, the invention compound has been found useful in exfoliative dermatitis, vaginal pruritis, heat rash such as diaper rash, contact dermatitis, poison ivy, acne vulgaris, dry skin conditions, burns and abrasions. The compound can be used for irrigation, douche, gargle, and in wet dressings.

It is believed that the lithium succinate of the invention preparations acts by replacement of cellular sodium by lithium; therefore, it is not surprising that a considerable variety of medications and treatments can exist using the novel preparations.

It is an object, therefore, of the present invention to provide therapeutic compositions suitable for topical applications.

Examples of suitable topical forms in accordance with this invention are a cream, an ointment, a powder, a skin cream and a hair dressing.

The general method for the preparation involves the incorporation of the principal active ingredient, lithium succinate, with any complementary active and supplementary ingredients, by dispersing it in a fixed oil, homogenizing into a cream, ointment, jelly or lotion, and like techniques depending on the form desired.

Aqueous solutions of lithium succinate can be formulated by incorporating the active ingredients in pharmaceutically acceptable liquid media. The liquid media can contain, for example, a pharmaceutically acceptable thickening agent e.g. sodium carboxymethylcellulose, and/or pharmaceutically acceptable thickening agent e.g. sodium carboxymethylcellulose, and/or pharmaceutically acceptable agents. Oily suspensions for oral use may be formulated in a suitable vegetable oil, for example arachis oil, which may contain suitable preservatives.

The lithium succinate can also be used in rectal suppository form by mixing them with suppository adjuvant materials, e.g. fatty acid esters of glycerine or glycols, e.g. cocoa butter, propylene glycol monostearate, etc., by techniques well known in the art.

The amount of active ingredients can vary over a wide range, from about 1 to about 90 percent by weight being operative in the final composition.

Various complementary active ingredients can be used with the principal active ingredient to provide desirable therapeutic effects. Analgesics, for example, benzyl alcohol and menthol, can be utilized; antibacterials and antibiotics, for example, bacitracin, polymyxin, and tetracyclines, can be utilized. Anti-inflammatory corticosteroids are especially useful complementary active ingredients. Anti-inflammatory corticosteroid is intended to mean those adrenal corticosteroids and their derivatives which possess local anti-inflammatory activity. These corticosteroids include prednisone, prednisolone, 6-methylprednisolone, and hydrocortisone.

Likewise, various supplementary ingredients can be used in the novel composition. The topical preparations can include preservatives, for example, benzyl alcohol, methylparaben, and propylparaben; topical bases, for example petrolatum, carbowax, permaceti, cetyl alcohol, emulsifiers, and the like.

The following examples are to set forth the best mode contemplated by the applicants of carrying out this invention but are not to be construed as limiting.

EXAMPLE 1

Rectal suppositories, each containing 200 mgs. of the succinate acid salt of lithium, are prepared from the following types and amounts of ingredients:

|   | Grams |
|---|---|
| Lithium succinate (desiccated) | 0.2 |
| Talcum | .05 |
| Stearic acid | .1 |
| Cocoa butter base | p.s.—.650 |

The above ingredients are mixed together and placed into suppository moulds and chilled for a period of about 12 hours at 0° C.

EXAMPLE 2

100 grams of cream are prepared from the following types and amounts of material:

|   | Grams |
|---|---|
| Lithium succinate | 5 |
| Ppt. sulphur | 5 |
| Cetyl alcohol base | 90 |

The ingredients are melted together by warming to about 78° C. A non-allergenic perfume and colour are added as required. The mixture is then stirred and allowed to cool to room temperature until the whole is congealed. This cream is satisfactory for local application to the scalp, as a hair dressing. The amount of lithium succinate can be increased to 20% or 30% by substituting the required amount of this ingredient for the amount used above.

EXAMPLE 3

100 grams of cream are prepared of the following types and amounts of ingredients:

|   | Grams |
|---|---|
| Lithium succinate | 10 |
| Base oil and water type (or mineral oil) approx. pH 4.9. | |
| Cetyl fatty saturated alcohols and non-irritant emulsifiers | 90 |

The lithium succinate is desiccated until water of crystallization is removed. Note: It is important in this step to avoid charring. After this, the basis is incorporated by melting together with warming to about 78° C. The mixture is then allowed to cool at room temperature until the whole is congealed. This cream is satisfactory for topical application where positive antipruritic action is required. The amount of the lithium succinate can be lowered or increased by substituting the necessary amounts of this ingredient for the amount used above.

EXAMPLE 4

100 grams of ointment are prepared from the following types and amounts of material:

|   | Grams |
|---|---|
| Lithium succinate | 10 |
| Lanoline base (anhydrous) (or other fatty base) non-allergic | 90 |

The two ingredients are melted together at about 75° C. with stirring until the whole mixture is homogeneous. The mixture is allowed to cool, with occasional stirring, until congealed at room temperature. This ointment is suitable for topical application to inflamed areas, and is particularly useful where a greasy base is indicated and also in dry skin conditions.

EXAMPLE 5

100 grams of powder is prepared from the following types and amounts of ingredients:

|   | Grams |
|---|---|
| Lithium succinate (exsiccated) | 10 |
| Zinc phenosulphate | 2 |
| Magnesium sulphate | 87 |
| Menthol | .5 |
| Thymol | .5 |

The lithium succinate is gradually worked into the mixture of the zinc phenosulphonate, magnesium sulphate, menthol and thymol. The whole mixture is milled until homogeneous and is suitable for use in burns, abrasions and the like.

EXAMPLE 6

100 grams of a pulverulent composition is prepared from the following types and amounts of ingredients:

|   | Grams |
|---|---|
| Lithium succinate (desiccated fine mesh powder) | 5 |
| Talc (silk mesh) base | 60 |
| Silicone powder | 35 |

The lithium succinate is blended into the mixture of the talc base and the silicone powder. The whole mixture is milled until homogeneous. Neutral color and non-allergenic perfume are added as required. The compound is suitable for dusting on inflamed areas and would be particularly useful as a hospital talc, a baby powder or to treat diaper rash created by prickly heat.

What is claimed:

1. A topical therapeutic composition comprising from 1–90% of lithium succinate incorporated in a pharmaceutically acceptable base for topical application selected from the group consisting of, cream bases, ointment bases, jelly bases, lotion bases, and powder bases.

2. The composition of claim 1 wherein said base is an ointment and which comprises from about one to about ninety percent by weight of said ointment of lithium succinate as the essential ingredient.

3. A method for producing an antipruritic effect comprising treating skin by applying thereto a therapeutic composition comprising from 1–90% of lithium succinate in a pharmaceutically acceptable carrier.

References Cited

UNITED STATES PATENTS

| 580,332 | 1896 | Anderson | 424—127 |
| 3,155,580 | 11/1964 | Bergy et al. | 424—271 |

OTHER REFERENCES

Chemicals Abstracts (49), p. 16237h, (1955).
Chemical Abstracts (40) p. 6169 [1], (1946).
Chemical Abstracts (25), p. 1331, (1931).
Chemical Abstracts (25), p. 5930, (1931).
Chemical Abstracts (56), p. 4050 [e], (1962).
Chemical Abstracts (57), p. 11484 [e], (1962).
Pharmaceutical Formulas, vol. 1 (12th ed.), 1953, pp. 615, 877 and 968.
Hackh's Chemical Dictionary, 3rd edition 1944, p. 496.

SAM ROSEN, Primary Examiner

U.S. Cl. X.R.
424—127, 153